United States Patent
Fuchs (10) Patent No.: US 9,844,824 B2
(45) Date of Patent: Dec. 19, 2017

(54) MACHINE TOOL SYSTEM

(75) Inventor: Rudolf Fuchs, Neuhausen (DE)

(73) Assignee: Robert Bosch GmbH, Stuttgart (DE)

(*) Notice: Subject to any disclaimer, the term of this patent is extended or adjusted under 35 U.S.C. 154(b) by 675 days.

(21) Appl. No.: 14/002,746

(22) PCT Filed: Mar. 2, 2012

(86) PCT No.: PCT/EP2012/000915
§ 371 (c)(1),
(2), (4) Date: Nov. 9, 2013

(87) PCT Pub. No.: WO2012/116826
PCT Pub. Date: Sep. 7, 2012

(65) Prior Publication Data
US 2014/0075765 A1   Mar. 20, 2014

(30) Foreign Application Priority Data
Mar. 3, 2011   (DE) .................. 10 2011 005 018

(51) Int. Cl.
 B23D 57/02   (2006.01)
 B27B 17/00   (2006.01)
(52) U.S. Cl.
 CPC ........... B23D 57/023 (2013.01); B27B 17/00 (2013.01); B27B 17/0083 (2013.01)
(58) Field of Classification Search
 CPC .... B27B 17/0083; B27B 17/00; B23D 57/023
 USPC ............... 30/373, 374, 382, 122, 386
 See application file for complete search history.

(56) References Cited

U.S. PATENT DOCUMENTS

| | | | |
|---|---|---|---|
| 3,092,156 A * | 6/1963 | Hayden | 30/371 |
| 3,604,479 A * | 9/1971 | Jordan | B27B 17/0091 144/34.1 |
| 3,965,788 A * | 6/1976 | Granberg | 83/745 |
| 4,146,962 A | 4/1979 | Grube | |
| 4,382,334 A | 5/1983 | Reynolds | |
| 4,453,438 A * | 6/1984 | Zelli | 83/745 |
| 4,726,274 A * | 2/1988 | Pitoni et al. | 83/745 |
| 4,821,415 A | 4/1989 | Kress | |
| 6,038,775 A * | 3/2000 | Holladay | 30/376 |
| 6,192,592 B1 * | 2/2001 | Zimmerman | 30/371 |

FOREIGN PATENT DOCUMENTS

| | | |
|---|---|---|
| AT | 384 389 B | 11/1987 |
| DE | 36 06 525 A1 | 9/1987 |
| DE | 201 20 984 U1 | 5/2002 |
| DE | 102 58 605 A1 | 7/2004 |

(Continued)

OTHER PUBLICATIONS

International Search Report corresponding to PCT Application No. PCT/EP2012/000915, dated Aug. 23, 2012 (German and English language document) (7 pages).

Primary Examiner — Omar Flores Sanchez
(74) Attorney, Agent, or Firm — Maginot, Moore & Beck LLP (57) ABSTRACT

A machine tool system comprises at least one portable machine tool and at least one separating device for a machine tool, which includes at least one cutting strand and at least one guide unit for guiding the cutting strand, said guide unit forming with the cutting strand a closed system. The machine tool system comprises at least one cutting edge guide unit.

9 Claims, 5 Drawing Sheets (56) References Cited

FOREIGN PATENT DOCUMENTS

| | | |
|---|---|---|
| DE | 10 2006 062 001 A1 | 3/2008 |
| EP | 0 062 188 A2 | 10/1982 |
| FR | 2 597 024 A1 | 10/1987 |
| RU | 2 169 070 C2 | 6/2001 |
| WO | 98/52728 A2 | 11/1998 |

\* cited by examiner

MACHINE TOOL SYSTEM

This application is a 35 U.S.C. §371 National Stage Application of PCT/EP2012/000915, filed on Mar. 2, 2012, which claims the benefit of priority to Serial No. DE 10 2011 005 018.3, filed on Mar. 3, 2011 in Germany, the disclosures of which are incorporated herein by reference in their entirety.

BACKGROUND

Machine tool systems are already known which comprise a portable machine tool and a machine tool separating device. In this case, the machine tool separating device has a cutting strand and a guide unit for guiding the cutting strand which jointly form a closed system.

SUMMARY

The disclosure proceeds from a machine tool system having at least one portable machine tool and having at least one machine tool separating device which comprises at least one cutting strand and at least one guide unit for guiding the cutting strand, which guide unit forms a closed system at least together with the cutting strand.

It is proposed that the machine tool system comprises at least one cutting edge guide unit. The cutting edge guide unit is particularly preferably provided in order to guide the machine tool separating device and/or the portable machine tool along a cutting edge. A "portable machine tool" here is supposed to refer in particular to a machine tool, in particular a manual machine tool which can be transported by an operator without a transport machine. The portable machine tool has in particular a mass which is smaller than 40 kg, preferably smaller than 10 kg and particularly preferably smaller than 5 kg.

A "cutting strand" here is supposed to refer in particular to a unit which is provided in order to locally increase an atomic cohesion of a workpiece to be machined, in particular by means of a mechanical cutting off and/or by means of a mechanical removal of material particles of the workpiece. "Provided" here is supposed to refer to in particular specially designed and/or specially equipped. The cutting strand is preferably provided in order to separate the workpiece into at least two physically separate parts and/or at least partially cut off and/or remove material particles of the workpiece starting from one surface of the workpiece. The cutting strand is particularly preferably moved rotationally in at least one operating state, in particular along a circumference of the guide unit.

A "guide unit" here is supposed to refer in particular to a unit which is provided in order to exert a constraining force on the cutting strand at least along a direction perpendicular to a cutting direction of the cutting strand in order to define a possible movement of the cutting strand along the cutting direction. The guide unit preferably has at least one guide element, in particular a guide groove, through which the cutting strand is guided. The cutting strand, as seen in a cutting plane, is preferably guided along an entire circumference of the guide unit through the guide unit by means of the guide element, in particular the guide groove. The guide unit is preferably formed as a blade. The term "blade" here is supposed to define in particular a geometric form which, as seen in the cutting plane, has a self-contained outer contour which comprises at least two straight lines which run parallel to one another and at least two connecting portions, in particular circular arcs, which connect in each case ends, which face one another, of the straight lines to one another. The guide unit thus has a geometric form which is composed, as seen in the cutting plane, from a rectangle and at least two sectors of a circle arranged on opposing sides of the rectangle. The term "cutting plane" here is supposed to define in particular a plane in which the cutting strand is moved in at least one operating state along a circumference of the guide unit in at least two opposing cutting directions relative to the guide unit. During machining of a workpiece, the cutting plane is preferably aligned at least substantially transverse to a workpiece surface being machined. "At least substantially transverse" here is supposed to refer in particular to an alignment of a plane and/or a direction relative to a further plane and/or a further direction which preferably deviates from a parallel alignment of the plane and/or the direction relative to the further plane and/or the further direction. It is, however, also conceivable that, during machining of a workpiece, the cutting plane is aligned at least substantially parallel to a workpiece surface to be machined, in particular in the case of a formation of the cutting strand as a grinding means, etc. The term "at least substantially parallel" here is supposed to refer in particular to an alignment of a direction relative to a reference direction, in particular in a plane, wherein the direction relative to the reference direction has a deviation in particular of less than 8°, advantageously less than 5° and particularly advantageously less than 2°.

A "cutting direction" here is supposed to refer to in particular a direction along which the cutting strand is moved to produce a cutting gap and/or cutting off and/or removing material particles of a workpiece to be machined in at least one operating state as a result of a driving force and/or of a driving torque, in particular in the guide unit. In one operating state, the cutting strand is preferably moved along the cutting direction relative to the guide unit. The term "closed system" here is supposed to define in particular a system which comprises at least two components which retain a functionality and/or are permanently connected to one another in the disassembled state by means of an interaction in a disassembled state of the system by a system superordinate to said system, such as, for example, a portable machine tool. The at least two components of the closed system for an operator are preferably connected to one another at least substantially undetachably. The term "at least substantially undetachably" here is supposed to refer in particular to a connection of at least two components which can only be separated from one another with the assistance of separating tools, such as, for example, a saw, in particular, a mechanical saw, etc., and/or chemical separating means such as, for example, solvents, etc. A "cutting edge guide unit" here is supposed to refer in particular to a unit which is provided in order to guide the machine tool separating device and/or the portable machine tool along a cutting edge of a cut which can be made by means of the cutting strand in a workpiece to be machined and largely prevent a deflection of the machine tool separating device and/or a deviation of the machine tool separating device from a desired cutting line. An exact cut can be advantageously achieved by means of the configuration according to the disclosure by adhering to the desired cutting line. Precise machining of a workpiece can thus be advantageously achieved.

It is furthermore proposed that the cutting edge guide unit comprises at least one cutting edge guide element which is provided, in the event of a movement of the machine tool separating device and/or of the portable machine tool relative to the cutting edge guide element, to exert, at least in a state of the machine tool separating device and/or of the portable machine tool coupled to the cutting edge guide element, constraining forces acting at least in two opposing directions on the machine tool separating device and/or on the portable machine tool. A "constraining force" here is supposed to refer in particular to a force which is provided in order to prevent a movement of a body in at least one direction and/or keep the body in the case of a movement on a path defined by means of an action of the force on the body. The constraining force acts particularly preferably at least substantially perpendicular to a surface and/or along which a body can move. The constraining forces thus act advantageously at least substantially perpendicular to a longitudinal axis of the cutting edge guide element on the machine tool separating device and/or the portable machine tool. The cutting edge guide unit is preferably formed as a linear guide unit. The term "linear guide unit" here is supposed to refer in particular to a unit which enables a translation of one or more movable components and simultaneously ensures maintenance of the direction of movement. The cutting edge guide element is particularly preferably formed as a guide rail. The cutting edge guide element is preferably placed on a surface of a workpiece to be machined. The cutting guide element preferably has a stop and/or a clamping device by means of which a movement of the cutting edge guide element along at least one direction of a workpiece to be machined can be prevented. In particular, the cutting edge guide element can be fixed by means of the clamping device on a surface of a workpiece to be machined relative to the workpiece. The cutting edge guide element can be advantageously placed with one edge on a cutting edge of a cut to be made in a workpiece to be machined by means of the cutting strand and/or on a predrawn cut line in order to achieve a precise cut. Precise guidance of the machine tool separating device along a cutting edge can advantageously be achieved.

The cutting edge guide element preferably has at least one rib-shaped connecting element which can be connected in a positive-locking manner to at least one corresponding coupling element of a cutting edge guide coupling unit of the portable machine tool. The coupling element is preferably formed to be groove-shaped. The connecting element and the coupling element are preferably provided in a state connected to one another in order to as far as possible prevent a movement of the machine tool separating device and/or the portable machine tool at least substantially transverse to a longitudinal axis of the cutting edge guide element. It is, however, also conceivable that the coupling element and/or the connecting element have a different corresponding configuration which seems to be expedient to a person skilled in the art. Particularly preferably, in a coupled state of the cutting edge guide unit to the cutting edge guide coupling unit, an edge of the cutting edge guide element which faces the machine tool separating device is as far as possible identical to a cutting edge of the cutting strand of the machine tool separating device. The cutting edge guide coupling unit can be formed at least partially in one piece with a coupling device of the portable machine tool which is provided in order to couple the machine tool separating device in a positive-locking and/or non-positive-locking manner to the portable machine tool. It is, however, also conceivable that the cutting edge guide coupling unit is formed in one piece with a machine tool housing or a base plate or the like of the portable machine tool. The term "in one piece" here is supposed to be understood in particular as at least adhesively connected, for example, by a welding process, a gluing process, a spraying process and/or another process which seems to be expedient to the person skilled in the art, and/or advantageously as formed in one piece, such as, for example, by production from a cast and/or by production in a one- or multi-component spraying process and advantageously from an individual blank. The term "coupling device" here is supposed to define in particular a device which is provided in order to effectively connect the machine tool separating device by means of a positive-locking and/or non-positive-locking connection for machining of a workpiece to the portable machine tool. In particular, forces and/or torques can be transmitted by a drive unit of the portable machine tool for driving of the cutting strand to the machine tool separating device in a state of the coupling device coupled to the machine tool separating device in an operating state of the portable machine tool. The coupling device is thus preferably formed as a tool receiver. Moreover, it is, however, also conceivable that the cutting edge guide coupling unit is formed separately from the coupling device of the portable machine tool and can be connected to a machine tool housing of the portable machine tool, for example, by means of a positive-locking and/or a non-positive-locking connection. Exact guidance of the machine tool separating device and/or of the portable machine tool along a cutting edge can advantageously be achieved by means of the configuration according to the disclosure. High flexibility in terms of a field of application of the portable machine tool can advantageously be achieved. In the event of the need for a cutting edge guide, a positive-locking connection to a cutting edge guide element can thus advantageously be achieved.

In a mounted state, the machine tool separating device is advantageously arranged along a direction running at least substantially perpendicular to a cutting plane of the cutting strand, between at least two coupling elements of the cutting edge guide coupling unit. The term "between" here is supposed to define in particular a spatial arrangement of a component along at least one direction between two sub-regions of a further component or between two further components, wherein preferably at least one straight line exists along the direction which intersects the component and both sub-regions of the further component or the component and the two further components. Guidance on both sides of the machine tool separating device and/or the portable machine tool can advantageously be produced.

It is furthermore proposed that at least the guide unit bears against the at least two coupling elements. In each case one of two outer surfaces of the guide unit in one sub-region preferably bears directly against in each case a side wall, which faces the guide unit, of one of the coupling elements. Each outer surface in each case with more than 10% of a total surface area of the outer surface, preferably with more than 20% and particularly preferably with more than 30% preferably bears against the side wall, which faces the guide unit, of one of the coupling elements. In particular, the outer surfaces in a sub-region of the guide unit bears against the coupling elements, which sub-region is arranged spaced apart from a torque introduction point for driving of the cutting strand at least by more than 5%, preferably more than 10% and particularly preferably at least more than 15% of a total length of the guide unit. The coupling elements thus preferably form a lateral support unit which is provided in order to support the machine tool separating device, in particular the guide unit, at least in two opposing directions. High lateral stability of the guide unit can be achieved particularly advantageously during machining of workpieces.

It is furthermore proposed that the cutting edge guide coupling unit has a longitudinal axis which is arranged at least in one operating state at least substantially perpendicular to a drive unit longitudinal axis of a drive unit of the portable machine tool. It is, however, also conceivable that the longitudinal axis has a different relative alignment to the longitudinal axis of the drive unit which seems to be expedient to a person skilled in the art. The term "drive unit" here is supposed to define in particular a unit which is provided in order to generate forces and/or torques for a driving of the cutting strand. Thermal energy, chemical energy and/or electrical energy is preferably converted into kinetic energy for the generation of forces and/or of torques by means of the drive unit. In particular, the drive unit is formed so that it can be coupled directly and/or indirectly to the cutting strand. The drive unit particularly preferably comprises at least one stator and at least one rotor which has at least one armature shaft. The term "longitudinal axis of the drive unit" here is supposed to refer in particular to an axis of the drive unit which runs at least substantially coaxially to a rotational axis of a drive shaft of the drive unit, in particular an armature shaft of the drive unit. In particular, the drive unit has maximum dimensions along the longitudinal axis of the drive unit. The term "longitudinal axis" here is supposed to define in particular an axis along which a component, in particular the cutting edge guide coupling unit has maximum dimensions. The term "substantially perpendicular" here is supposed to define in particular an alignment of a direction relative to a reference direction, wherein the direction and the reference direction, in particular as seen in one plane, enclose an angle of 90° and the angle has a maximum deviation of in particular less than 8°, advantageously less than 5° and particularly advantageously less than 2°. A compact machine tool can be advantageously achieved by means of the configuration according to the disclosure of the machine tool system. A high degree of ease of operation when machining a workpiece for an operator can furthermore be advantageously achieved.

The disclosure furthermore proceeds from a machine tool separating device for a machine tool system according to the disclosure, with at least one cutting strand and with at least one guide unit for guiding the cutting strand. It is proposed that the machine tool separating device comprises at least one cutting edge guide coupling unit which can be coupled to at least one cutting edge guide element of a cutting edge guide unit. Precise machining of a workpiece by means of the machine tool separating device according to the disclosure can thus particularly advantageously be achieved.

The cutting edge guide coupling unit is preferably formed at least partially in one piece with the guide unit. It is, however, also conceivable that the cutting edge guide coupling unit is connected detachably to the guide unit by means of a positive-locking and/or non-positive-locking connection. A compact configuration of the cutting edge guide coupling unit can be advantageously achieved.

It is furthermore proposed that the cutting edge guide coupling unit has at least one coupling element which is provided in order to accommodate rib-shaped connecting elements of the cutting edge guide element. In this case, the coupling element is particularly preferably formed in a groove shape. It is, however, also conceivable that the coupling element and/or the connecting element have a different configuration which seems to be expedient to a person skilled in the art. Exact guidance of the machine tool separating device along a cutting edge can advantageously be achieved.

The disclosure furthermore proceeds from a portable machine tool for a machine tool system according to the disclosure, having at least one coupling device which can be coupled in a positive-locking manner and/or non-positive-locking manner to a machine tool separating device, and having at least one cutting edge guide coupling unit which can be coupled to at least one cutting edge guide element of a cutting edge guide unit. Coupling of the cutting edge guide unit can be advantageously achieved in a structurally simple manner and precise working with the portable machine tool can also be advantageously achieved.

The machine tool separating device according to the disclosure and/or the portable machine tool according to the disclosure should in this case not be restricted to the use and embodiment described above. In particular, the machine tool separating device according to the disclosure and/or the portable machine tool according to the disclosure can have a number which differs from a number cited herein of individual elements, components and units in order to fulfill a mode of operation described herein.

BRIEF DESCRIPTION OF THE DRAWINGS

Further advantages will become apparent from the following description of the drawings. Exemplary embodiments of the disclosure are shown in the drawings. The drawings, the description and the claims contain numerous features in combination. The person skilled in the art will also appropriately consider the features individually and combine them to form expedient further combinations.

In the drawings.

DETAILED DESCRIPTION

Figure 1:
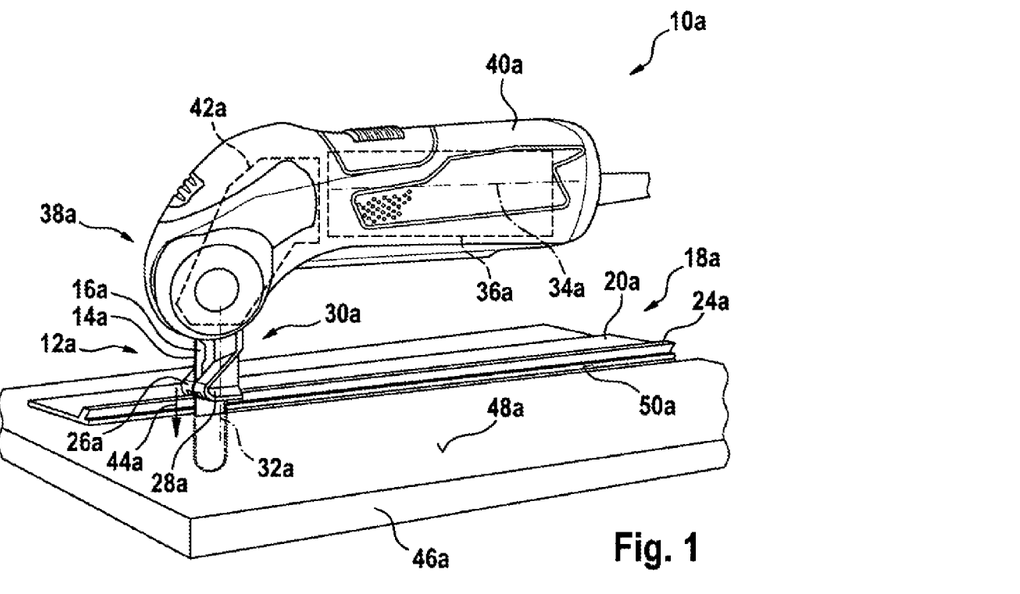
FIG. 1 shows a machine tool system according to the disclosure having a cutting edge guide unit according to the disclosure in a schematic representation.

FIG. 1 shows a portable machine tool 10a with a machine tool separating device 12a which jointly form a machine tool system. Portable machine tool 10a has a coupling device 38a for positive-locking and/or non-positive-locking coupling to machine tool separating device 12a. Coupling device 38a can in this case be formed as a bayonet joint and/or as a different coupling device which seems to be expedient to a person skilled in the art. Portable machine tool 10a furthermore has a machine tool housing 40a which encloses a drive unit 36a and a transmission unit 42a of portable machine tool 10a. Drive unit 36a and transmission unit 42a are effectively connected to one another in a manner already known to a person skilled in the art for the generation of a drive torque which can be transmitted to machine tool separating device 12a. In this case, drive unit 36a and/or transmission unit 42a are provided in order in a mounted state to be coupled by means of coupling device 38a to a cutting strand 14a of machine tool separating device 12a. Transmission unit 42a of portable machine tool 10a is formed as an angular transmission. Drive unit 36a is formed as an electric motor unit. It is, however, also conceivable that drive unit 36a and/or transmission unit 42a have a different configuration which seems to be expedient to the person skilled in the art. Drive unit 36a is provided in order to drive cutting strand 14a of machine tool separating device 12a in at least one operating state with a cutting speed lower than 6 m/s. In this case, portable machine tool 10a has at least one operating mode in which driving of cutting strand 14a in a guide unit 16a of machine tool separating device 12a along a cutting direction 44a of cutting strand 14a with a cutting speed of lower than 6 m/s is enabled.

The machine tool system furthermore comprises a cutting edge guide unit 18a which is provided in order to guide machine tool separating device 12a and/or portable machine tool 10a along a desired cutting edge. Cutting edge guide unit 18a comprises in this case a first cutting edge guide element 20a which is provided, in the case of a movement of machine tool separating device 12a and/or portable machine tool 10a relative to first cutting edge guide element 20a at least in a state of machine tool separating device 12a and/or portable machine tool 10a coupled to first cutting edge guide element 20a, to exert constraining forces acting in two opposing directions on machine tool separating device 12a and/or on portable machine tool 10a. First cutting edge guide element 20a can furthermore be placed on a surface 48a of workpiece 46a for guidance of machine tool separating device 12a and/or portable machine tool 10a along a cutting edge when machining a workpiece 46a. In order to make a cut in workpiece 46a, portable machine tool 10a is moved together with machine tool separating device 12a arranged in coupling device 38a by an operator along a guide surface 50a of first cutting edge guide element 20a and/or a guide surface 52a of second cutting edge guide element 22a.

For precise guidance of machine tool separating device 12a and/or of portable machine tool 10a, first cutting edge guide element 20a has a rib-shaped connecting element 24a (FIG. 2) which can be connected in a positive-locking manner to one of two corresponding coupling elements 26a, 28a of a cutting edge guide coupling unit 30a of portable machine tool 10a. Rib-shaped connecting element 24a extends along a longitudinal axis of first cutting edge guide element 20a along an entire extension of first cutting edge guide element 20a. Cutting edge guide unit 18a furthermore has a second cutting edge guide element 22a which has an analogous configuration to first cutting edge guide element 20a. Second cutting edge guide element 22a thus also has a rib-like connecting element 54a for positive-locking connection to one of coupling elements 26a, 28a of cutting edge guide coupling unit 30a. First cutting edge guide element 20a and second cutting edge guide element 22a are formed as guide rails. It is, however, also conceivable that first cutting edge guide element 20a has a different configuration which seems to be expedient to a person skilled in the art. First cutting edge guide element 20a and second cutting edge guide element 20a can be detachably connected by means of connecting elements 24a, 54a as required to coupling elements 26a, 28a. Connecting elements 24a, 54a are arranged in a state connected to cutting edge guide coupling unit 30a on a side of first and/or second cutting edge guide element 20a, 22a facing portable machine tool 10a. In a state connected to cutting edge guide coupling unit 30a of cutting edge guide elements 20a, 22a, rail edges of first cutting edge guide element 20a and of second cutting edge guide element 22a facing machine tool separating device 12a are identical to cutting edges of a cut which can be made in workpiece 46a by means of cutting strand 14a. In this case, a spacing of the cutting edges, as seen along a perpendicular to the cutting plane of cutting strand 14a, specifies a maximum width of the cut which can be made by means of cutting strand 14a.

Figure 2:
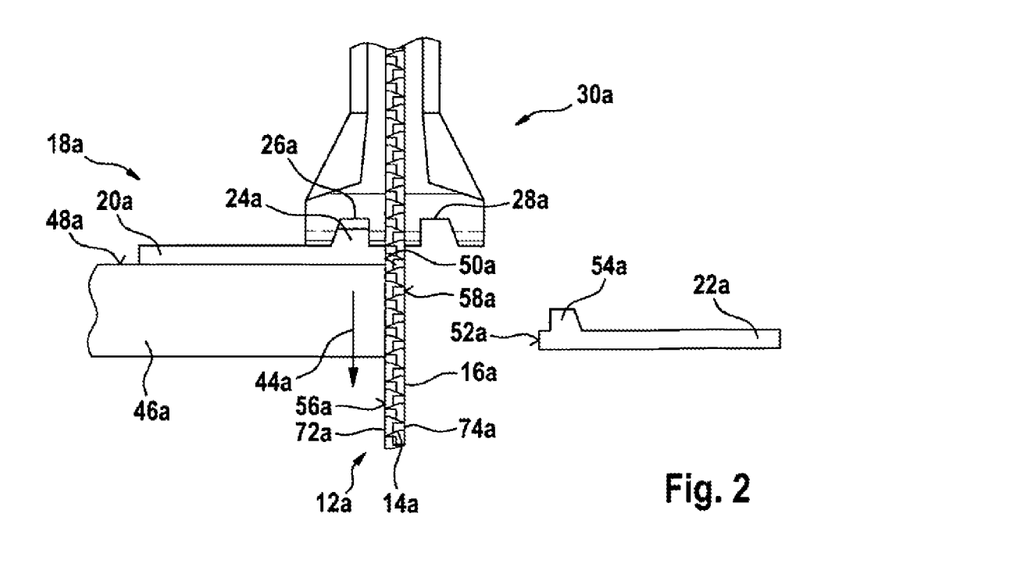
FIG. 2 shows a detailed view of the cutting edge guide unit and a cutting edge guide coupling unit of a portable machine tool according to the disclosure in a schematic representation.

Machine tool separating device 12a is arranged in a mounted state along a direction running at least substantially perpendicular to a cutting plane of cutting strand 14a between two coupling elements 26a, 28a of cutting edge guide coupling unit 30a. Guide unit 16a bears with a sub-region of guide unit 16a against two coupling elements 26a, 28a of cutting edge guide coupling unit 30a. In this case, an outer surface 56a of guide unit 16a which faces one of coupling elements 26a, 28a bears with a partial surface of outer surface 56a against coupling element 26a which faces outer surface 56a. A further outer surface 58a of guide unit 16a which faces coupling elements 26a, 28a bears with a partial surface of further outer surface 58a against coupling element 28a which faces further outer surface 58a. Outer surface 56a and further outer surface 58a run at least substantially parallel to one another and at least substantially parallel to the cutting plane of cutting strand 14a. Guide unit 16a is thus supported along two directions running oppositely and at least substantially perpendicular to the cutting plane laterally in a sub-region of guide unit 16a by coupling elements 26a, 28a by means of the bearing of outer surface 56a and of further outer surface 58a against coupling elements 26a, 28a. Cutting edge guide coupling unit 30a in this case has a longitudinal axis 32a which is arranged at least in one operating state at least substantially perpendicular to a longitudinal axis 34a of the drive unit of drive unit 36a of portable machine tool 10a. Longitudinal axis 34a of the drive unit runs coaxially to a rotational axis of a drive shaft formed as an armature shaft (not shown in greater detail here) of drive unit 36a. It is, however, also conceivable that longitudinal axis 32a of cutting edge guide coupling unit 30a has a different alignment which seems to be expedient to a person skilled in the art.

When machining workpiece 46a, a cutting line is marked on surface 48a of workpiece 46a by means of a marker such as, for example, a pencil. The cutting line serves in this case as orientation for the operator as to the point at which a cut should be made in workpiece 46a by means of cutting strand 14a. First cutting edge guide element 20a and/or second cutting edge guide element 22a are placed by the operator on surface 48a of the workpiece and moved with a rail edge towards the cutting line until the rail edge and the cutting line are flush. In a mode for making the cut by means of cutting strand 14a, portable machine tool 10a is placed on an outer edge of workpiece 46a and moved along guide surface 50a of first cutting edge guide element 20a and/or along guide surface 52a of second cutting edge guide element 22a. In this case, one of coupling elements 24a, 26a of cutting edge guide coupling unit 30a is connected in a positive-locking manner to one of connecting elements 24a, 54a of first cutting edge guide element 20a and/or of second cutting edge guide element 22a. Machine tool separating device 12a and/or portable machine tool 10a is thus guided precisely along the cutting line by means of first cutting edge guide element 20a and/or of second cutting edge guide element 22a of cutting edge guide unit 18a for making a cut by means of cutting strand 14a.

Figure 3:
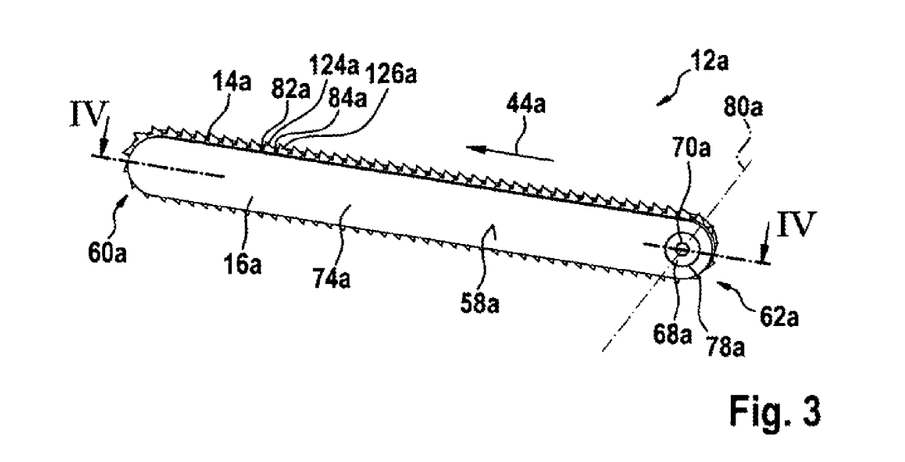
FIG. 3 shows a detailed view of a machine tool separating device according to the disclosure in a schematic representation.
Figure 7:
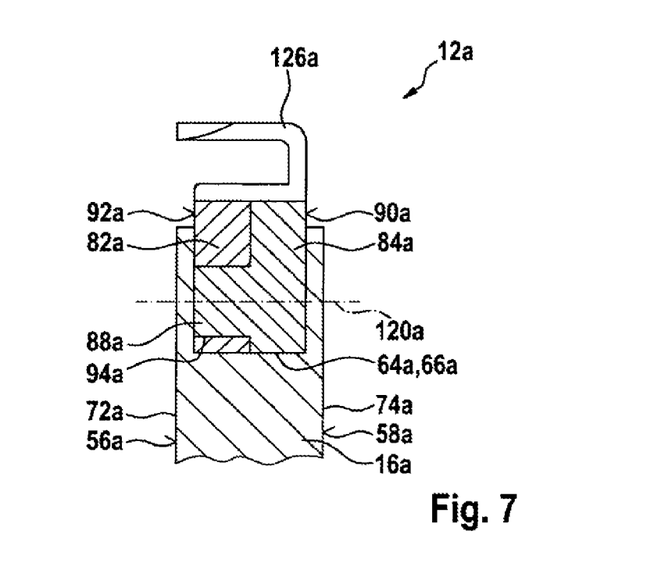
FIG. 7 shows a detailed view of an arrangement of the blade carrier elements in a guide unit of the machine tool separating device according to the disclosure in a schematic representation.

FIG. 3 shows machine tool separating device 12a in an uncoupled state from coupling device 38a of portable machine tool 10a. Machine tool separating device 12a has cutting strand 14a and guide unit 16a which jointly form a closed system. Guide unit 16a is formed as a blade. Guide unit 16a, as seen in the cutting plane of cutting strand 14a, furthermore has at least two convexly formed ends 60a, 62a. Convexly formed ends 60a, 62a of guide unit 16a are arranged on two sides of guide unit 16a which face away from one another. Cutting strand 14a is guided by means of guide unit 16a. To this end, guide unit 16a has at least one guide element 64a (FIG. 7) by means of which cutting strand 14a is guided. In this case, guide element 64a is formed as a guide groove 66a which extends in the cutting plane of cutting strand 14a along an entire circumference of guide unit 16a. In this case, cutting strand 14a is guided by means of edge regions of guide unit 16a which delimit guide groove 66a. It is, however, also conceivable that guide element 64a is formed in a different manner which seems to be expedient to a person skilled in the art, such as, for example, as a rib-like formation on guide unit 16a which engages in a recess on cutting strand 14a. Cutting strand 14a is, as seen in a plane running perpendicular to the cutting plane, surrounded by three sides of the edge regions which delimit guide groove 66a (FIG. 7). Cutting strand 14a is moved during an operation rotationally along the circumference in guide groove 66a relative to guide unit 16a.

Figure 4:
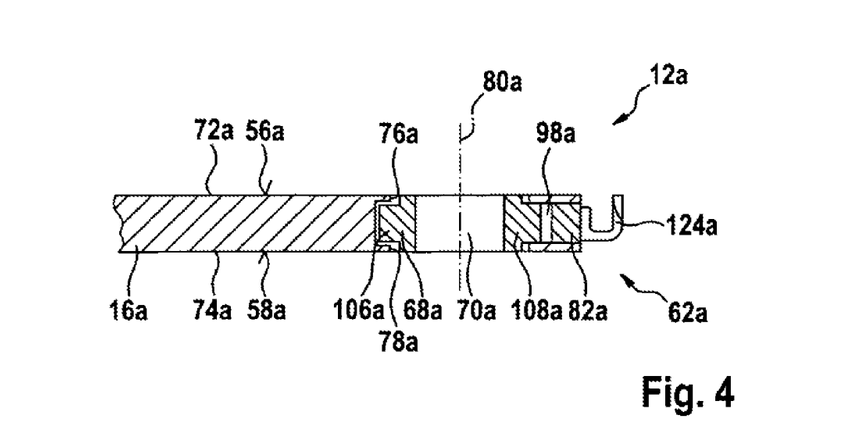
FIG. 4 shows a sectional view along line Iv-Iv from FIG. 3 of the machine tool separating device according to the disclosure in a schematic representation.

Machine tool separating device 12a furthermore has a torque transmission element 68a mounted at least partially by means of guide unit 16a for driving cutting strand 14a. In this case, torque transmission element 68a has a coupling recess 70a which in a mounted state can be coupled to drive unit 36a and/or transmission unit 42a. Coupling recess 70a is arranged concentrically in torque transmission element 68a. Coupling recess 70a is formed as an internal hexagon. It is, however, also conceivable that coupling recess 70a has a different configuration which seems to be expedient to a person skilled in the art. In an uncoupled state of torque transmission element 68a to drive unit 36a and/or transmission unit 42a, torque transmission element 68a is arranged transverse to cutting direction 44a of cutting strand 14a and/or along cutting direction 44a in guide unit 16a (FIG. 4). In this case, torque transmission element 68a is arranged at least partially between two outer walls 72a, 74a of guide unit 16a. Outer walls 72a, 74a run at least substantially parallel to the cutting plane of cutting strand 14a. Guide unit 16a has in outer surfaces 56a, 58a of outer walls 72a, 74a in each case a recess 76a, 78a in which torque transmission element 68a is at least partially arranged.

Torque transmission element 68a is arranged with a sub-region in recesses 76a, 78a of outer walls 72a, 74a.

Torque transmission element 68a has in this case at least in the sub-region arranged in recesses 76a, 78a an extension along an axis of rotation 80a of torque transmission element 68a which ends flush with one of outer surfaces 56a, 58a of guide unit 16a. Moreover, the sub-region of torque transmission element 68a arranged in recesses 76a, 78a of outer surfaces 56a, 58a of guide unit 16a has an outer dimension which extends at least substantially perpendicular to axis of rotation 80a of torque transmission element 68a and which is at least 0.1 mm smaller than an internal dimension of recesses 76a, 78a which extends at least substantially perpendicular to axis of rotation 80a of torque transmission element 68a. The sub-region of torque transmission element 68a arranged in recesses 76a, 78a is arranged spaced apart along a direction running perpendicular to axis of rotation 80a in each case from an edge of outer walls 72a, 74a which delimits respective recess 76a, 78a. The sub-region of torque transmission element 68a arranged in recesses 76a, 78a thus has play within recesses 76a, 78a.

Figure 5:
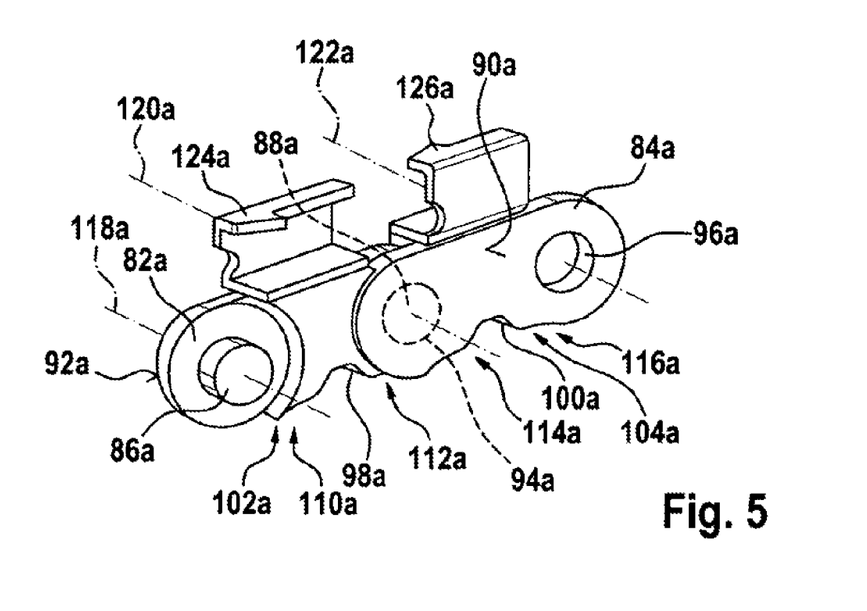
FIG. 5 shows a detailed view of blade carrier elements of a cutting strand of the machine tool separating device according to the disclosure in a schematic representation.

FIG. 5 shows a detailed view of blade carrier elements 82a, 84a of cutting strand 14a of machine tool separating device 12a. Cutting strand 14a comprises a plurality of blade carrier elements 82a, 84a which are connected to one another and which are connected to one another in each case by means of a connecting element 86a, 88a of cutting strand 14a which ends at least substantially flush with one of two outer surfaces 90a, 92a of one of blade carrier elements 82a, 84a connected to one another (cf. also FIG. 7). Connecting elements 86a, 88a are formed bolt-shaped. Outer surfaces 90a, 92a run in a state of cutting strand 14a arranged in guide groove 66a at least substantially parallel to the cutting plane of cutting strand 14a. A person skilled in the art will select a number of blade carrier elements 82a, 84a which is suitable depending on the application for cutting strand 14a. Blade carrier elements 82a, 84a are formed in each case in one piece with one of connecting elements 86a, 88a. Blade carrier elements 82a, 84a furthermore have in each case a connecting recess 94a, 96a for accommodating one of connecting elements 86a, 88a of blade carrier elements 82a, 84a which are connected to one another. Connecting elements 86a, 88a are guided by means of guide unit 16a (FIG. 7). In this case, connecting elements 86a, 88a are arranged in guide groove 66a in a mounted state of cutting strand 16a. Connecting elements 86a, 88a can be supported in each case, as seen in a plane running perpendicular to the cutting plane, on two edge regions which delimit guide groove 66a.

Figure 6:
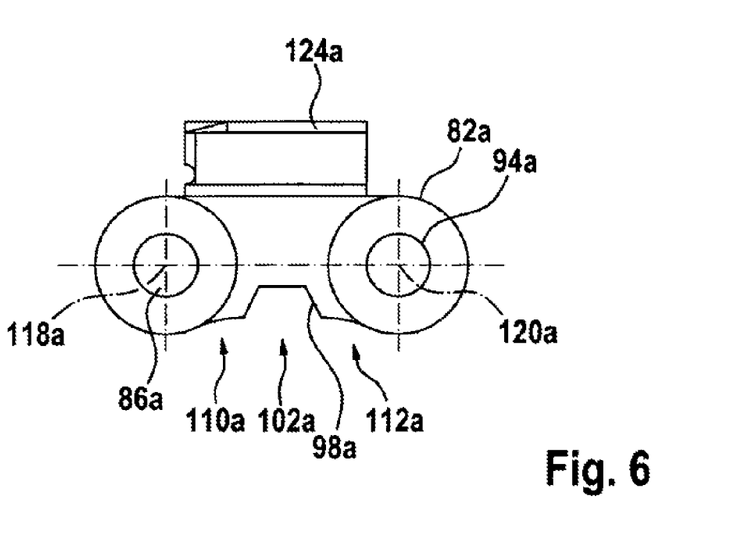
FIG. 6 shows a further detailed view of one of the blade carrier elements of the cutting strand of the machine tool separating device according to the disclosure in a schematic representation.

Blade carrier elements 82a, 84a of cutting strand 14a have in each case a drive recess 98a, 100a which is arranged in each case in a mounted state on a side 102a, 104a of respective blade carrier element 82a, 84a which faces torque transmission element 68a. Torque transmission element 68a engages into drive recess 98a, 100a in at least one operating state for driving of cutting strand 14a. Torque transmission element 68a is formed in this case as a gear wheel. Torque transmission element 68a thus comprises teeth 106a, 108a which are provided in order to engage in drive recess 98a, 100a of blade carrier elements 82a, 84a in at least one operating state for driving of cutting strand 14a. Sides 102a, 104a of blade carrier elements 82a, 84a which face torque transmission element 68a are moreover formed in a circular arc shape. Sides 102a, 104a of blade carrier elements 82a, 84a which face torque transmission element 68a in a mounted state are configured in a circular arc shape in each case in sub-regions 110a, 112a, 114a, 116a, as seen between a central axis 118a of respective connecting element 86a, 88a and a central axis 120a, 122a of respective connecting recess 94a, 96a. Circular arc shaped sub-regions 110a, 112a, 114a, 116a are formed in each case adjacent to drive recesses 98a, 100a, into which torque transmission element 68a engages. In this case, circular arc shaped sub-regions 110a, 112a, 114a, 116a have a radius which corresponds to a radius of a profile of guide groove 66a at convex ends 60a, 62a. Sub-regions 110a, 112a, 114a, 116a are formed in a concave manner (FIGS. 5 and 6).

Cutting strand 14a furthermore has a plurality of cutting elements 124a, 126a. Cutting elements 124a, 126a are formed in each case in one piece with one of blade carrier elements 82a, 84a. A number of cutting elements 124a, 126a is dependent on a number of blade carrier elements 82a, 84a. A person skilled in the art will select a suitable number of cutting elements 124a, 126a depending on the number of blade carrier elements 82a, 84a. Cutting elements 124a, 126a are provided in order to enable a cutting off and/or a removal of material particles of workpiece 46a to be machined in order to make a cut by means of cutting strand 14a. Cutting elements 124a, 126a can be formed, for example, as full chisels, half chisels or another type of blade which seem to be expedient to a person skilled in the art which are provided to enable a cutting off and/or a removal of material particles of a workpiece to be machined. Cutting strand 14a is formed continuously. Cutting strand 14a is thus formed as a cutting chain. Blade carrier elements 82a, 84a are formed in this case as chain links which are connected to one another by means of bolt-shaped connecting elements 86a, 88a. It is, however, also conceivable that cutting strand 14a, blade carrier elements 82a, 84a and/or connecting elements 86a, 88a are configured in a different manner which seems to be expedient to a person skilled in the art.

Figure 8:
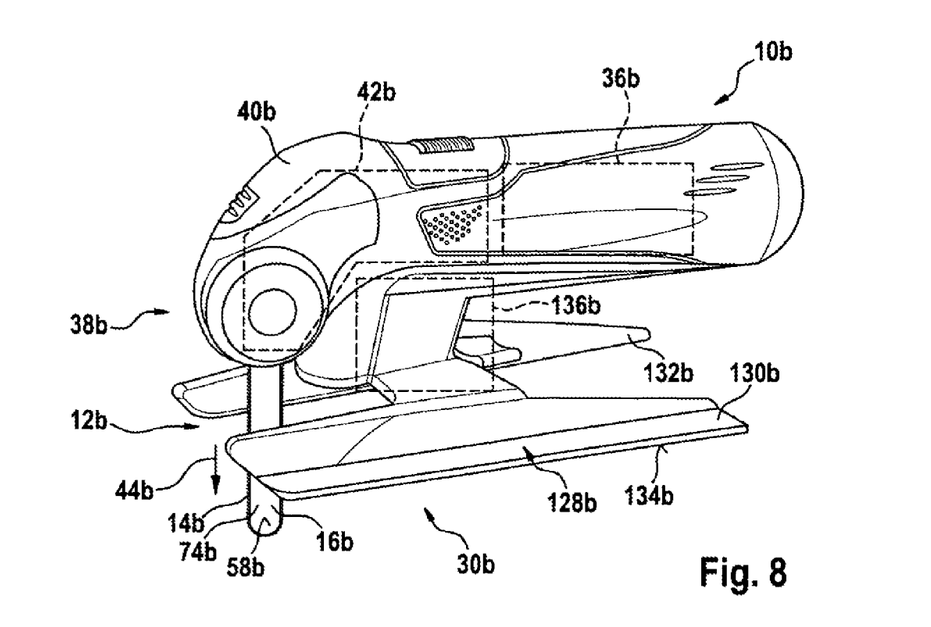
FIG. 8 shows an alternative portable machine tool according to the disclosure in a schematic representation.
Figure 9:
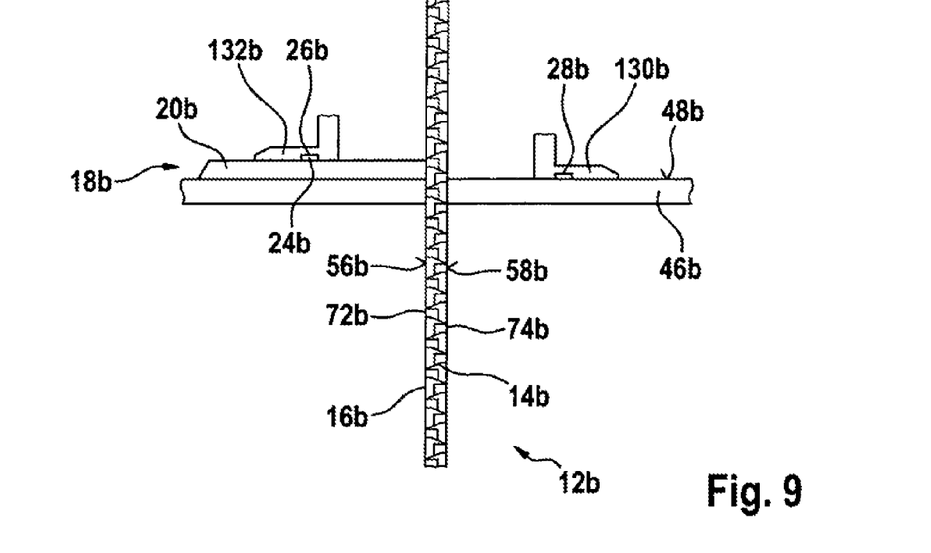
FIG. 9 shows a detailed view of the alternative portable machine tool according to the disclosure with a cutting edge guide unit in place in a schematic representation.
Figure 10:
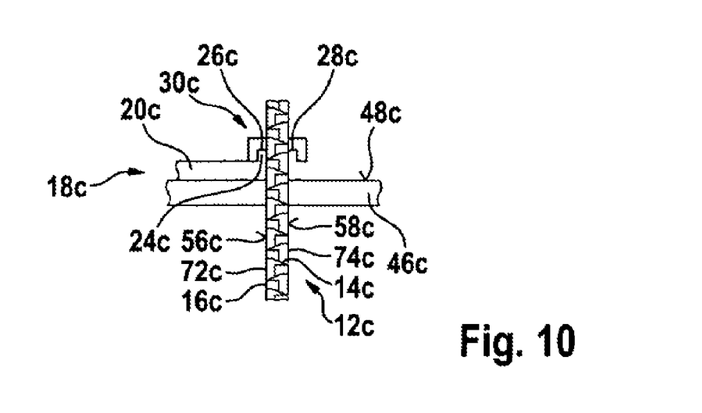
FIG. 10 shows an alternative machine tool separating device according to the invention disclosure in a schematic representation.

Two alternative exemplary embodiments are shown in FIGS. 8 to 10. Substantially identical components, features and functions are in principle designated by the same reference numbers. For differentiation between the exemplary embodiments, the letters a to c are added to the reference numbers of the exemplary embodiments. The following description is substantially restricted to the differences to the first exemplary embodiment in FIGS. 1 to 7, wherein in terms of identical components, features and functions reference can be made to the description of the first exemplary embodiment in FIGS. 1 to 7.

FIG. 8 shows an alternative portable machine tool 10b with a machine tool separating device 12b which jointly form a machine tool system. Machine tool separating device 12b has a structure similar to machine tool separating device 12a described in the description of FIGS. 1 to 7. Portable machine tool 10b has a coupling device 38b for positive-locking and/or non-positive-locking coupling to machine tool separating device 12b. Portable machine tool 10b furthermore has a machine tool housing 40b which encloses a drive unit 36b and a transmission unit 42b of portable machine tool 10b. Drive unit 36b and transmission unit 42b are effectively connected to one another for generation of a torque which can be transmitted to machine tool separating device 12b in a manner already known to a person skilled in the art. In this case, drive unit 36b and/or transmission unit 42b are provided to be coupled to a cutting strand 14b of machine tool separating device 12b in a mounted state by means of coupling device 38b. Portable machine tool 10b furthermore comprises a bearing unit 128b for bearing on a workpiece 46b to be machined by means of portable machine tool 10b (FIG. 9). Bearing unit 128b is formed as a sliding block and/or as a base plate by means of which portable machine tool 10b slides and/or is supported on workpiece 46b in the case of normal handling during machining of a workpiece.

The machine tool system furthermore comprises a cutting edge guide unit 18b which is provided in order to guide machine tool separating device 12b and/or portable machine tool 10b along a desired cutting edge. Cutting edge guide unit 18b comprises in this case a first cutting edge guide element 20b which is provided in order to exert constraining forces acting at least in two opposing directions on machine tool separating device 12b and/or on portable machine tool 10b during a movement of machine tool separating device 12b and/or of portable machine tool 10b relative to first cutting edge guide element 20b at least in a state of machine tool separating device 12b and/or of portable machine tool 10b coupled to first cutting edge guide element 20b. In this case, portable machine tool 10b comprises a cutting edge guide coupling unit 30b for positive locking connection of portable machine tool 10b to cutting edge guide element 20b. Cutting edge guide coupling unit 30b is formed in this case in one piece with bearing unit 128b. Bearing unit 128b comprises two bearing elements 130b, 132b which are provided in order to be placed on a surface 48b of workpiece 46b for guiding of portable machine tool 10b when machining workpiece 46b. Bearing elements 130b, 132b are adjustable by means of an adjusting unit 136b along a direction running at least substantially perpendicular to a bearing surface 134b of bearing elements 130b, 132b (FIG. 9). Stop elements 130b, 132b can thus be adjusted to a height of cutting edge guide element 20b.

Cutting edge guide element 20b has a rib-shaped connecting element 24b for precise guidance of machine tool separating device 12b and/or of portable machine tool 10b (FIG. 9), which connecting element 24b can be connected to one of two corresponding coupling elements 26b, 28b of cutting edge guide coupling unit 30b in a positive-locking manner. Cutting edge guide element 20b can be detachably connected to one of coupling elements 26b, 28b where required by means of connecting element 24b. Connecting element 24b is arranged on a side of cutting edge guide element 20b which faces portable machine tool 10b in a state connected to cutting edge guide coupling unit 30b. In each case one of coupling elements 26b, 28b is arranged on one of bearing elements 130b, 136b. In this case, coupling elements 26b, 28b are arranged on a side of bearing elements 130b, 132b which faces cutting edge guide element 20b in a state connected to cutting edge guide element 20b. In a state of cutting edge guide element 20b connected to cutting edge guide coupling unit 30b, rail edges of cutting edge guide element 20b facing machine tool separating device 12b are identical to cutting edges of a cut which can be made in workpiece 46b by means of cutting strand 14b.

FIG. 10 shows an alternative machine tool separating device 12c with a cutting strand 14c and with a guide unit 16c for guiding cutting strand 14c. Machine tool separating device 12c comprises a cutting edge guide coupling unit 30c which can be connected to at least one cutting edge guide element 20c of a cutting edge guide unit 18c in a positive-locking manner in order to achieve constraining forces which act in two opposing directions on guide unit 16c. Cutting edge guide coupling unit 30c is partially formed in one piece with guide unit 16c. Cutting edge guide coupling unit 30c has two coupling elements 26c, 28c which are provided to accommodate a rib-shaped connecting element 24c of cutting edge guide element 20c. In this case, coupling elements 26c, 28c are in each case formed in one piece with one of two outer walls 72c, 74c of guide unit 16c.

The invention claimed is:
1. A machine tool system comprising:
  at least one portable machine tool;
  at least one machine tool separating device including at least one cutting strand and at least one guide unit configured to guide the cutting strand, the at least one guide unit and the at least one cutting strand defining a closed system mountable to the machine tool, the at least one cutting strand defining a cutting plane;
at least one cutting edge guide unit;
a cutting edge guide coupling unit fastened to one of the machine tool and the at least one guide unit, the cutting edge guide coupling unit including at least two integral coupling elements configured to engage the at least one cutting edge guide unit, and
in a mounted state, the machine tool separating device is arranged with the cutting plane of the at least one cutting strand between the at least two integral coupling elements of the cutting edge guide coupling unit.

2. The machine tool system as claimed in claim 1, wherein the cutting edge guide unit includes at least one cutting edge guide element configured, when at least one of the machine tool separating device and the portable machine tool is coupled to the cutting edge guide element and in the event of a movement of the at least one of the machine tool separating device and the portable machine tool relative to the cutting edge guide element, to exert constraining forces acting at least in two opposing directions on the at least one of the machine tool separating device and the portable machine tool.

3. The machine tool system as claimed in claim 2, wherein:
the cutting edge guide element includes at least one rib-shaped connecting element, configured to be connected to a corresponding coupling element of the at least two integral coupling elements.

4. The machine tool system as claimed in claim 1, wherein the at least one guide unit bears against the at least two integral coupling elements.

5. The machine tool system as claimed in claim 2, wherein the cutting edge guide coupling unit defines a longitudinal axis arranged, at least in one operating state, at least substantially perpendicular to a drive unit longitudinal axis of a drive unit of the portable machine tool.

6. A machine tool separating device for a machine tool system including a portable power tool, the machine tool separating device comprising:
at least one cutting strand defining a cutting plane;
at least one guide unit mountable to the power tool and configured to guide the cutting strand; and
at least one cutting edge guide coupling unit fastened to one of the machine tool and the at least one guide unit, the cutting edge guide coupling unit including at least two integral coupling elements configured to be connected to at least one cutting edge guide element of a cutting edge guide unit in a manner to exert constraining forces acting at least in two opposing directions on the at least one guide unit, and
in a mounted state, the machine tool separating device is arranged with the cutting plane of the cutting strand between the at least two integral coupling elements of the cutting edge guide coupling unit.

7. The machine tool separating device as claimed in claim 6, wherein the cutting edge guide coupling unit is formed at least partially in one piece with the at least one guide unit.

8. The machine tool separating device as claimed in claim 6, wherein the at least one coupling element is configured to accommodate at least one rib-shaped connecting element of the cutting edge guide element.

9. The machine tool system as claimed in claim 2, wherein the at least one cutting edge guide element is configured to exert said constraining forces in said two opposing directions transverse to the cutting plane.

* * * * *